US 9,824,265 B2

United States Patent
Zhong et al.

(10) Patent No.: US 9,824,265 B2
(45) Date of Patent: Nov. 21, 2017

(54) ROTATION AND PACE INDEPENDENT MOBILE GAIT ANALYSIS

(71) Applicant: BAE Systems Information and Electronic Systems Integration Inc., Nashua, NH (US)

(72) Inventors: Yu Zhong, Winchester, MA (US); Yunbin Deng, Westford, MA (US); Geoffrey S. Meltzner, Natick, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/180,532

(22) Filed: Jun. 13, 2016

(65) Prior Publication Data

US 2016/0307031 A1    Oct. 20, 2016

Related U.S. Application Data

(63) Continuation of application No. 14/445,149, filed on Jul. 29, 2014.

(60) Provisional application No. 62/174,574, filed on Jun. 12, 2015, provisional application No. 61/894,107, filed on Oct. 22, 2013.

(51) Int. Cl.
*G01P 15/00* (2006.01)
*G06K 9/00* (2006.01)
*G06K 9/46* (2006.01)

(52) U.S. Cl.
CPC ........... *G06K 9/00348* (2013.01); *G06K 9/46* (2013.01)

(58) Field of Classification Search
CPC ........... A61K 2300/00; A61K 31/4704; A61K 45/06; A61K 9/0053; A61K 38/16; A61K 9/2866; A61K 31/44; A61K 31/4409; A61K 38/00; A61K 38/168; A61K 2039/505; A61K 31/137; A61K 31/277; A61K 38/10; H04L 12/2829; H04L 12/6418; H04L 2012/2841; H04L 2012/285; H04L 29/06; H04L 29/06047; H04L 51/36; H04L 51/38; H04L 63/08; H04L 63/0861; H04L 63/0876; H04L 65/1083; H04L 65/403; H04L 65/605
See application file for complete search history.

(56) References Cited

U.S. PATENT DOCUMENTS

| | | | |
|---|---|---|---|
| 8,753,275 B2 | 6/2014 | Najafi et al. | |
| 9,060,714 B2 | 6/2015 | Bajcsy et al. | |
| 2008/0162088 A1* | 7/2008 | DeVaul | A61B 5/0024 702/190 |

(Continued)

FOREIGN PATENT DOCUMENTS

WO PCT/US2008/000928    1/2008

OTHER PUBLICATIONS

Han, Xu (Gait Recognition Considering Walking Direction, University of Rochester, Aug. 20, 2010).*

(Continued)

*Primary Examiner* — Roy Y Yi
(74) *Attorney, Agent, or Firm* — Davis & Bujold P.L.L.C.

(57) ABSTRACT

A method for identifying individuals using inertial sensor based gait biometrics. A method for identifying individual persons using orientation and pace invariant gait dynamics images (GDIs). A method of biometric authentication using i-vectors for GDIs.

11 Claims, 8 Drawing Sheets

(56) References Cited

U.S. PATENT DOCUMENTS

2014/0129189 A1* 5/2014 Gyorfi .................. G01C 21/165
703/2

OTHER PUBLICATIONS

J. Manty Jarvi, J. Himberg, and T. Seppanen, Recognizing human motion with multiple acceleration sensors, Systems, Man, and Cybernetics, 2001 IEEE International Conference, pp. 747-752, vol. 2, http://ieeexplore.ieee.org/xpl/articleDetailsjsp?tp=&arnumber=973004&queryText%3DRecognizing+human+motion+with+multipleD+acceleration+sensors%2C+ 2001.

J. Manty Jarvi, M. Lindholm, E. Vildjiounaite, S.-M. Makela, H. Ailisto, Identifying users of portable 2 devices from gait pattern with accelerometers, Acoustics, Speech, and Signal Processing, 2005 IEEE International D Conference, pp. 973-976, vol. 2, http://ieeexplore.ieee.org/xpl/articleDetails.jsp?tp=&arnumber= 1415569&queryText%3DAcoustics%2C+Speech%2C+and+Signal+Processing%2C+2005%2C+vol.

J. Frank, S. Mannor, J. Pineau, and D. Precup, Time Series Analysis Using Geometric Template Matching, 3 Pattern Analysis and Machine Intelligence, Mar. 2013, IEEE Transactions, pp. 740-754, vol. 35, Issue 3, D http://ieeexplore.ieee.org/xpl/articleDetails.jsp?arnumber=6205761.

S. Sprager and M. Juri, Inertial Sensor-based Gait Recognition: A review, MDPI, Sep. 2, 2015, http://www.ncbi.nlm.nih.gov/pmc/articles/PMC4610468/.

C. Mims, Smart Phones that Know their Users by How they walk, Technology Review, Sep. 16, 2010, https://www.technologyreview.com/s/420835/smart-phones-that-know-their-users-by-how-they-walk.

D. Storm, Biometrics: Dream come true or nightmare?, Mar. 3, 2011, http://www.computerworld.com/article/2470679/endpoint-security/biometrics--dream-come-tru-or-nightmare?.

Gait Analysis, Wikipedia, https://en.wikipediia.org/wiki/Gait_analysis, accessed Apr. 29, 2016.

J. Boyd and J. Little, Biometric Gait Recognition, Biometrics School 2003, LNCS 3161, pp. 19-42, 2005.

Vishal M. Patel, Rama Chellappa, Deepak Chandra, and Brandon Barbello, Continuous User Authentication on Mobile Devices, IEEE Signal Processing Magazine, 2016.

Yu Zhong, Yunbin Deng, Sensor orientation invariant mobile gait biometrics, 2014 IEEE International Joint Conference on Biometrics (IJCB).

Yu Zhong, Yunbin Deng, Geoffrey Meltzner, Pace independent mobile gait biometrics, 2015 IEEE 7th International Conference on Biometrics Theory, Applications and Systems (BTAS)).

* cited by examiner

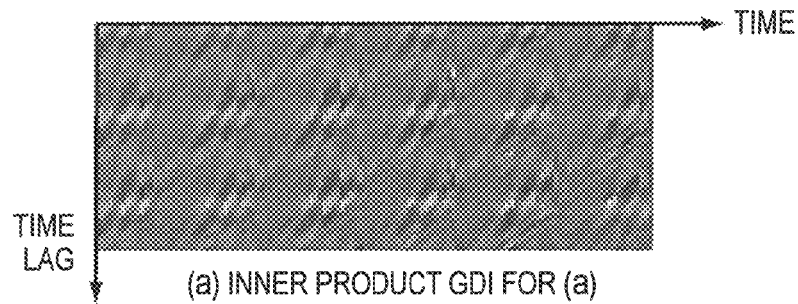
FIG.5A (a) INNER PRODUCT GDI FOR (a)
FIG.5B (b) INNER PRODUCT GDI FOR (b)
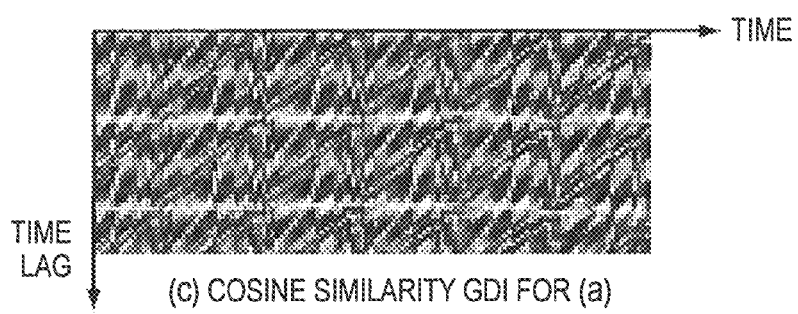
FIG.5C (c) COSINE SIMILARITY GDI FOR (a)
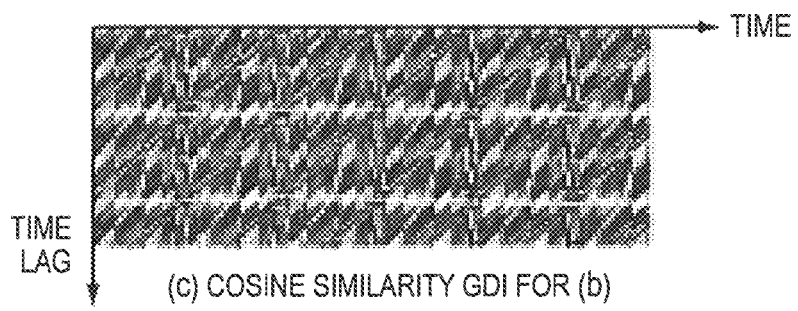
FIG.5D (c) COSINE SIMILARITY GDI FOR (b)

% *I(L,T)* is the input gait dynamics image

% the following code returns the optimal path for Eq. 4

% *S(l,t)* stores the score for the optimal path reaching node *(l,t)* from the leftmost column % *M(l,t)* stores the move from the previous node on the optimal path that reaches node *(l,t)*:

up, down, or level, for back tracking initialize a 2D array of scores S(L,T) to 0 initialize a 2D array of moves M(L,T-1) to 0

% scan and initialize scores for left most column

*t=0;* for *l=0* to *L-1*

$$S(l,t) = \alpha(l - T_{cycle})^2 - I(l,t)$$

end

% scan and update subsequent columns based on previous column for *t=1* to *T-1*

FIG. 7

ROTATION AND PACE INDEPENDENT MOBILE GAIT ANALYSIS

CROSS REFERENCE TO RELATED APPLICATIONS

This application claims the benefit of U.S. Provisional Application No. 62/174,574, filed Jun. 12, 2015, and is also a continuation-in-part of application Ser. No. 14/445,149, filed Jul. 19, 2014, which claims priority from U.S. Provisional Application No. 61/894,107, filed Oct. 22, 2013, the disclosure of each of which are incorporated by reference herein in their entirety.

STATEMENT OF GOVERNMENT INTEREST

This disclosure was made with United States Government support under Contract No. FA8750-13-C-0225 awarded by U.S. Department of the Air Force. The United States Government has certain rights in this disclosure.

FIELD OF THE DISCLOSURE

The present disclosure relates to mobile gait analysis and more particularly to orientation and pace invariant mobile gait analysis as used in biometrics.

BACKGROUND OF THE DISCLOSURE

Gait is the special pattern of human locomotion. It is fairly unique to an individual due to one's specific muscular-skeletal bio-mechanism. Humans can often recognize acquaintances by the way they walk or jog. However, as a behavioral biometrics, gait may also be affected by transient factors such as tiredness, sickness, emotions, and the like. In addition, external factors such as clothes, shoes, carried loads, and floor characteristics can also influence gait. Such motion analysis would be useful for health monitoring, disease diagnosis, and the like.

Automatic gait biometrics, which studies gait using sensory data, has been an active research area receiving increasing attention over the years. Similar to fingerprints and iris biometrics, gait biometrics can be performed for two purposes: (1) identification, where a gait is compared to a database of enrolled gaits with known identities to determine whom the unknown gait belongs to, and (2) authentication, where a gait is compared to the enrolled gait data of a known person to validate the identity.

Computer vision based gait recognition extracts motion features from image sequences for gait classification. These approaches are, in general, susceptible to variations in viewing geometry, background clutter, varying appearances, uncontrolled lighting conditions, and low image resolutions. Measurements from floor pressure sensors have also been explored for gait recognition. However, these systems are usually too cumbersome to deploy for practical applications.

In the past decade, accelerometers have been intensely researched for gait and activity analysis. These sensors directly measure locomotion when worn on a human body. Such sensors are advantageous compared to both videos and floor sensors for automatic gait biometrics. Vision based approaches must infer body motion from cluttered images. It is highly ambiguous, error prone, and vulnerable to variations in a number of external factors. In contrast, accelerometers directly measure human body motion to achieve more accurate gait biometrics. Accelerometers are also inexpensive, small in size, and very easy to deploy. Mobile devices such as smart phones and tablets use accelerometers to automatically determine the screen layout for improved user experience. In one embodiment of the disclosure, the ubiquity of mobile devices embedded with inertial sensors is used to collect motion data continuously for unobtrusive gait-based authentication and identification.

Accelerometer based gait and activity analysis has been a popular research area since the pioneering work done by Mantyjarvi et al. about a decade ago. As is disclosed in J. Mantyjarvi, J. Himberg, and T. Seppanen, Recognizing Human Motion with Multiple Acceleration Sensors, IEEE Int'l Conf. Systems, Man, and Cybernetics, 2001 and J. Mantyjarvi, M. Lindholm, E. Vildjiounaite, S.-M. Makela, and H. Ailisto, Identifying Users of Portable Devices From Gait Pattern with Accelerometers, IEEE Int'l Conf. Acoustics, Speech, and Signal Processing, vol. 2, pp. 973-976, 2005, the contents of which are incorporated herein. Earlier work used multiple motion sensors attached to human body parts to analyze their movements and bio kinematics. Later, data from a single sensor at a fixed position such as the feet, hips, or waist was also exploited. With the proliferation of smart phones equipped with advanced sensors, there has been a surge of research interest on the use of accelerometers in commercial off the shelf (COT) mobile devices for activity and gait classification. Unlike the dedicated sensors used in earlier research, accelerometer signals in mobile devices are usually irregularly sampled at a relatively low frame rate for power conservation and efficient resource sharing.

Triple axis accelerometers capture accelerations along three orthogonal axes of the sensor. Given a multivariate time series of the acceleration data, feature vectors are usually extracted for signal windows corresponding to each detected gait cycle or for windows of a pre-specified size. These windows are compared and matched based on template matching, using either the correlation method or dynamic time warping. Alternatively, statistical features including mean, standard deviations, or time span between peaks in windows, histograms, entropy, higher order moments, and features in spatial domain are also used. Fast Fourier Transforms (FFT) and wavelet coefficients in the frequency domain are used to compare longer sequences. Classifiers including nearest neighbor classifier, support vector machine (SVM), and Kohonen self-organizing map have been used. In some cases, preprocessing such as weighted moving average is applied to suppress the noise in data.

Despite the surge in research efforts, gait biometrics using accelerometers still faces an immense challenge in dealing with variations typical in practical applications. As a behavioral biometric, gait exhibits far more variability than physiological biometrics such as fingerprint or iris biometrics. A person's gait is influenced by his/her physical or psychological status such as emotion, fatigue, well-being, and the like. In addition, external factors such as clothes, shoes, carried loads, and ground characteristics can influence a person's gait. To make it even more challenging, there are huge variations in existing data collection processes. Currently, accelerometers only measure local motion where they are worn, and motion patterns differ from one part of the body to another due to the articulated nature of body motion. Even when the sensor is placed at a fixed location, the data measurements can still change depending on the orientation of the sensors.

Most existing research has been conducted in controlled laboratory settings to minimize these variations. In some cases the sensors are placed in a specific way so that intuitive meanings can be assigned to the data components and exploited for gain analysis. As such, existing methods are susceptible to errors when used in real-world conditions. Although promising results have been reported in well-controlled studies on gait biometrics using accelerometers, there is still a large performance gap between laboratory research and real-world applications. For practical applications, it may be unrealistic to assume fixed placement of the sensor. Mobile devices are usually carried casually in pockets or hands without constraints in orientation. Since the same external motion results in completely different measurements with changing sensor orientation, it is essential to compute gait biometrics robust to sensor rotation for realistic scenarios. However, research on this aspect is rather scarce.

Mantyjarvi et al. used both principle component analysis (PCA) and independent component analysis (ICA) to discover "interesting directions" to compute gait features for activity analysis. The underlying assumption of identical data distributions for both training and testing data are unlikely to hold for realistic applications and computed gait features based on magnitude measurements. The computation of an univariate magnitude series using raw 3D multivariate series resulted in information loss and ambiguity artifacts.

One approach to this challenge has been augmenting the training set with simulated data at multiple sensor orientations by artificially rotating available training data. However, significant artificial sampling was needed to tessellate the 3D rotational space and creates unbearable computational and storage burden with the additional risk of degraded classifier performance. Orientation invariant features were also extracted using the power spectrum of the time series. However, this methodology suffered shortcomings common to frequency domain methods: loss of temporal locality and precision, and vulnerability to drifting in gait tempo. Others have used a co-built-in gyroscope sensor to calibrate accelerometer data to the up-right posture in order to reduce the influence of noise in sensor orientation. This approach requires calibration prior to every data collection, expects the sensor to not rotate during data collection, only relieves noise in the vertical direction, and makes unrealistic assumptions that all poses are up-right.

The previous studies paint a picture of drastic degradation in gait recognition performance in the more relaxed scenarios. Even with the new invariant features, an accuracy of approximately 50% was reported. On the other hand, performances in the high 90s are often achieved in more controlled scenarios. Although each study used its own dataset and evaluation standards so the numbers are not directly comparable, the constant large gap in performance does highlight the challenge in realistic gait biometrics using orientation dependent motion sensors.

Although state-of-the-art accelerometer based gait recognition techniques work fairly well under constrained conditions, their performance degrades significantly for real world applications where variations in sensor placement, footwear, outfit, and performed activities persist. For a mobile device based gait biometrics system to succeed, it is crucial to address the variations in inertial sensor orientation due to casual handling of mobile devices. It is also crucial to address variation in pace and terrain to accurately use gait analysis in real world applications.

SUMMARY OF THE DISCLOSURE

It has been recognized that a need exists for an improved way to use inertial sensors in the field of gait biometrics.

One aspect of the present disclosure is a method of identifying an individual using gait analysis comprising: receiving acceleration data from an inertial sensor carried by an individual, wherein the acceleration data corresponds to a gait of the individual; calculating rotational invariant values based, at least in part, on the acceleration data, wherein the rotational invariant values are independent of a orientation of the inertial sensor on the individual; generating a gait dynamics image (GDI) based, at least in part, on the rotational invariant values; identifying a quasi-periodic nature of the gait signals under a general energy minimization paradigm with a Bayesian interpretation; building pace independent GDIs to achieve invariance to sensor orientation and gait speed; and matching the GDI to one of a set predetermined gait data to identify the individual.

One embodiment of the present disclosure is wherein the calculating a rotational invariant value further comprises: calculating inner product values according to: $I_{inner}(\vec{A(t_1)}, \vec{A(t_2)}) = <\vec{A(t_1)}, \vec{A(t_2)}>$ where $\vec{A(t_1)}=[x(t_1)\ y(t_1)z(t_1)]^T$ and $\vec{A(t_2)}=[x(t_2)\ y(t_2)z(t_2)]^T$ are two 3D acceleration vectors at times $t_1$ and $t_2$.

One embodiment of the present disclosure is wherein the calculating a rotational invariant value further comprises: calculating cosine similarity measure values according to:

$$I_{cos}(\vec{A(t_1)}, \vec{A(t_2)}) = \frac{\langle \vec{A(t_1)}, \vec{A(t_2)} \rangle}{\|\vec{A(t_1)}\|\ \|\vec{A(t_2)}\|}$$

where $\vec{A(t_1)}=[x(t_1)y(t_1)z(t_1)]^T$ and $\vec{A(t_2)}=[x(t_2)y(t_2)z(t_2)]^T$ are two 3D acceleration vectors at times $t_1$ and $t_2$.

One embodiment of the present disclosure is wherein the generating the GDI further comprises generating the GDI according to: $GDI=I_{cos}$ (j,i=j−1); where: i=1, . . . , 1 and j=1, . . . , n−l+1 and where l is the range of the time delay.

One embodiment of the present disclosure is wherein the GDI is a first GDI and further comprises: calculating a correlation value associated with a first GDI and a known GDI and wherein the matching the GDIs further comprises matching the first GDI to identify the individual based, at least in part, on the correlation value.

One embodiment of the present disclosure is wherein building pace independent GDIs comprises: computing the horizontal path across the gait dynamics image with the maximum sum of responses on the path; extracting local gait cycle lengths from the path; and normalizing the gait dynamics image to a previously specified gait length for pace independent gait matching.

One embodiment of the present disclosure is wherein the building pace independent GDIs further comprises: modeling a gait i-vector.

One embodiment of the present disclosure is wherein the modeling a gait i-vector further comprises: building a universal background model (UBM) using a Gaussian mixture model (GMM) by pooling a plurality of GDI feature vectors from a training set.

One embodiment of the present disclosure is wherein the modeling a gait i-vector further comprises: computing a supervector for each GDI feature sequence of L frames $\{y_1 \cdot y_2 \cdot \ldots \cdot y_L\}$, where each frame is a feature vector of dimension F according to: the posterior probability ($N_c$) and Baum-Welch statistics ($F_c$) for each Gaussian component are computed as: $N_c = \Sigma_{t=1}^{L} P(c|y_t, \Omega)$, and $F_c = \Sigma_{t=1}^{L} P(y_t, \Omega)(y_t -$ $m_c$), where m is the mean vector for Gaussian component c; and obtaining a supervector M by concatenating for $F_c$ all Gaussian components to form a vector of fixed dimension C•F for an input gait sequence of arbitrary length L.

One embodiment of the present disclosure is wherein the modeling a gait i-vector further comprises: conducting factor analysis using a simplified linear model according to: M=m+Tw where m is a subject independent component, T is a low rank rectangular matrix, and w is the i-vector.

One embodiment of the present disclosure is wherein the modeling an i-vector further comprises: computing the gait i-vector according to: $w=(I+T'\Sigma^{-1}NT)^{-1} T'\Sigma^{-1} M$, where N is a diagonal matrix consisting of diagonal blocks of $N_c I$, the total variability matrix is T, and a residue variability covariance matrix $\Sigma$.

One embodiment of the present disclosure is wherein identifying a quasi-periodic nature of the gait signals comprises, encoding, using a prior term, the expected or average length of a typical gait cycle; utilizing a regularization term enforcing smoothness; and utilizing a likelihood term drawing the path to the maximum response in the GDI image.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 3A illustrates example x-, y-, and z-acceleration components from an inertial sensor embedded in a mobile phone carried by a walking subject that capture the distinguishing locomotion patterns characteristic of a person's gait.

FIG. 3B illustrates example acceleration data for the same subject as FIG. 3A using a rotated phone to provides an alternative "view" of the same gait.

FIG. 3C illustrates the magnitude sequence for the multivariate time series in FIG. 3D according to the principles of the present disclosure.

FIG. 3D illustrates the magnitude sequence for the multivariate time series in FIG. 3B according to the principles of the present disclosure.

FIG. 5A-5D contains images of gait dynamics images for inner product GDI and cosine similarity GDI in FIG. 5A and FIG. 5C for the data in FIG. 3A and FIG. 3C, respectively; and images of gait dynamics images for; inner product GDI and cosine similarity GDI in FIG. 5B and FIG. 5D for the data in FIG. 3B and Figure FIG. 3D, respectively.

FIG. 7 shows pseudo code for cycle estimation using dynamic programming for one embodiment of the present disclosure.

DETAILED DESCRIPTION OF THE PREFERRED EMBODIMENT

Accelerometers embedded in mobile devices have shown great potential for non-obtrusive gait biometrics by directly capturing a user's characteristic locomotion. Although gait analysis using these sensors has achieved highly accurate authentication and identification performance under controlled experimental settings, the robustness of such algorithms in the presence of assorted variations typical in real world scenarios remains a major challenge. In this disclosure, we provide a pace independent mobile gait biometrics algorithm that is insensitive to variability in walking speed. This approach exploits invariant mobile gait representations independent of inertial sensor rotation.

Mobile gait biometrics is a valuable tool for identifying an individual in a number of applications. Biometrics allows for not only identification, but authentication. By using mobile gait analysis, authentication could be seamless for a number of wearable technologies. Another application for mobile gait analysis is for military and civil defense applications such as knowing where soldiers are located in a battlefield where precision strikes are occurring. Additionally, is would be very beneficial to know the location of emergency personnel in buildings and structures. The ability to analyze gait using inertial sensors could also have healthcare applications, such as diagnosing and/or monitoring health issues.

In certain embodiments of the method of mobile gait biometrics of the present disclosure, varying walking speed is addressed. In certain embodiments, Gait Dynamics Images (GDIs) are used. In certain embodiments, the mobile gait representation of the present disclosure is both independent of walking speed and invariant to sensor orientation.

In some embodiments, GDIs are used to estimate instantaneous gait cycles and to rectify the time axis such that gait cycles become constant with respect to the new axis, and unwarp the GDI using the rectified time axis to derive pace-independent gait dynamics images. In certain embodiments of the system of the present disclosure, instantaneous gait cycles are estimated using accelerometer data from a casually carried mobile device as well as 1) prior knowledge of gait cycles, 2) continuity constraints in walking speed as it varies, and 3) the quasi-periodic nature of gait signals under a general energy minimization paradigm using a Bayesian interpretation for robust gait cycle estimation. In certain embodiments, a dynamic programming approach that efficiently solves the energy minimization problem is used. In contrast, even though gait cycle detection and estimation is very important to the accuracy of gait biometrics, previous work mostly imposed strict and unrealistic sensor placements to boost cycle saliency in captured data so that they are easy to detect, and used ad hoc methods to extract gait cycles.

Figure 1:
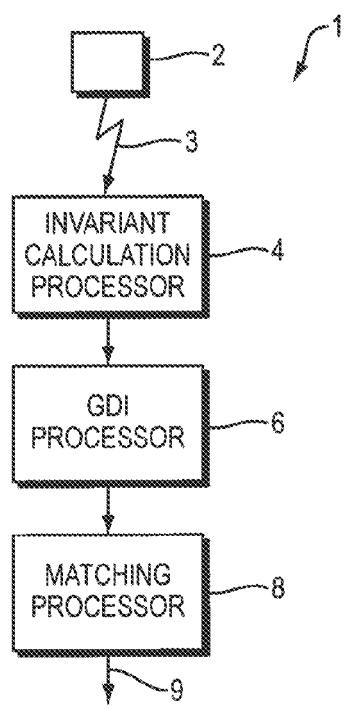
FIG. 1 illustrates one embodiment of a system for determining the identity of a person based, at least in part, on their gait.

FIG. 1 illustrates one embodiment of a system 1 for identifying a person based on their gait. This system includes an inertial sensor 2, an invariant calculation processor 4, a gait dynamics image (GDI) processor 6, and a matching processor 8. The invariant calculation processor 4, as discussed below, calculates invariant values associated with a vector captured by the inertial sensor 2 that are independent of the rotational orientation of the accelerometer 2. The system may include a wireless link 3 over which the vector is transferred from the inertial sensor 2 to the invariant processor 4. As discussed in detail below, the GDI processor 6 generates a gait dynamics image based, at least in part, on the invariant values. As also discussed below, the matching processor 8 matches the gait dynamics images to known gaits of many people. This result may be output on output line 9.

"Processor" and "Logic", as used herein, includes but are not limited to hardware, firmware, software and/or combinations of each to perform a function(s) or an action(s), and/or to cause a function or action from another logic, method, and/or system. For example, based on a desired application or needs, logic and/or processor may include a software controlled microprocessor, discrete logic, an application specific integrated circuit (ASIC), a programmed logic device, a memory device containing instructions, or the like. Logic and/or processor may include one or more gaits, combinations of gaits, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

Accelerometers were originally introduced to mobile devices to automatically adjust the screen display layout. The most commonly used 3-axis accelerometers measure accelerations along three orthogonal axes of the sensor. The gravity vector can be computed using these measurements to determine the device orientation. As it turns out, these acceleration measurements also capture the distinguishing locomotion patterns that are characteristics of a user's gait and can be used for gait analysis, including biometric authentication, identification, activity tracking, health monitoring, and many other applications. In certain embodiments, gait analysis would be useful for health monitoring, disease diagnosis, and the like.

Figure 2:
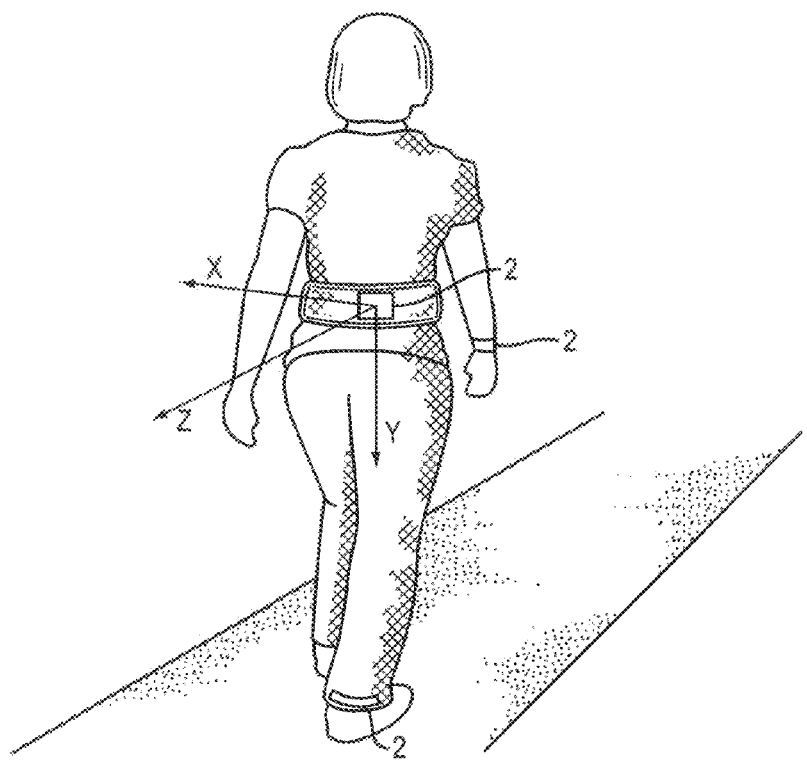
FIG. 2 is an illustration of an inertial sensor being carried by an individual.

FIG. 2 illustrates an example sensor that, in one embodiment, is the inertial sensor 2 of FIG. 1 attached to back of the waist of a person and additionally illustrates orthogonal x, y and z axes. In certain embodiments, the inertial sensor may be proximate to the user's ankle. In certain embodiments, the inertial sensor may be proximate to the user's wrist. In certain embodiments, the inertial sensor may be embedded in clothing or implanted in the user.

Figure 3A:
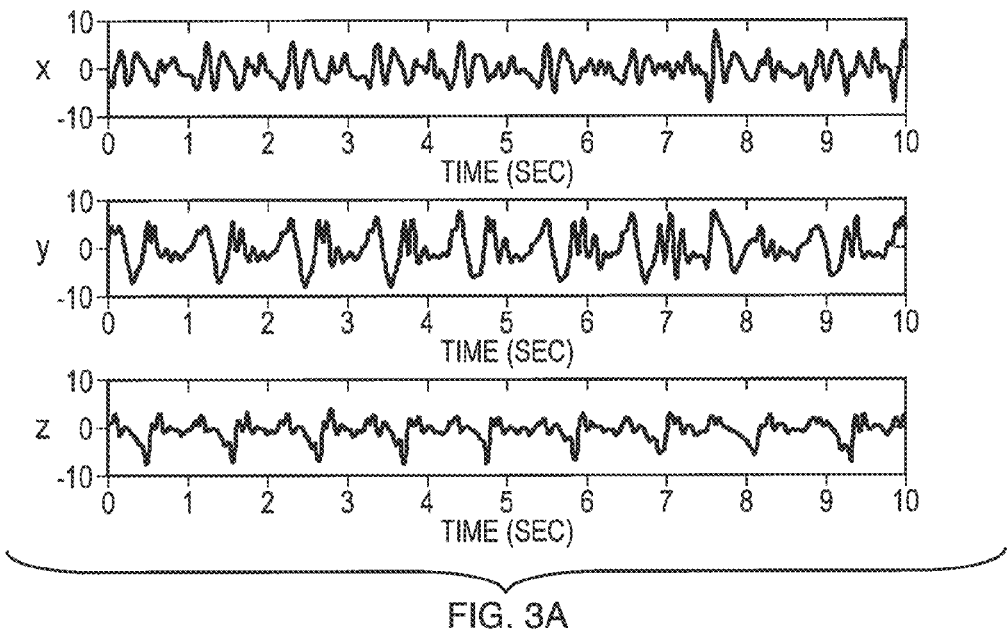
FIG. 3A-3D are a series of graphs of actual collected acceleration data for one embodiment of the present disclosure.
Figure 3B:
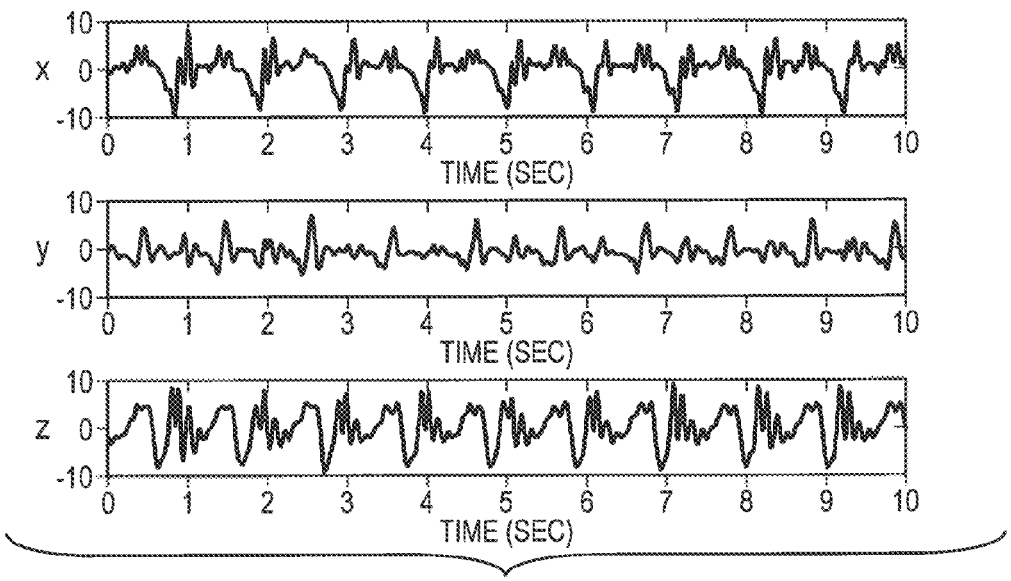
Figure 3C:
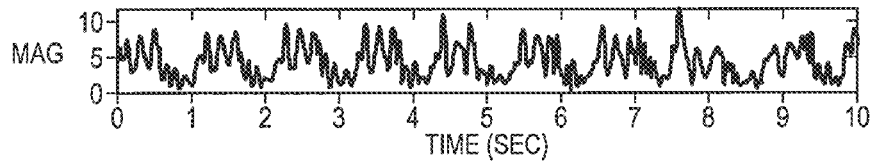
Figure 3D:
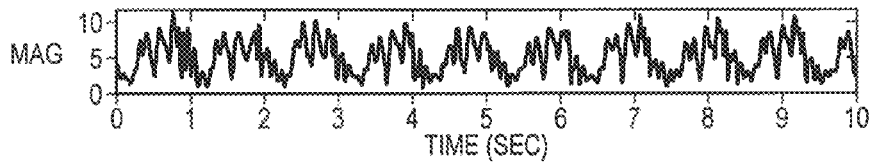

A major challenge for current mobile device based gait biometrics is the data dependency on sensor orientation. FIGS. 3A and 3B illustrate sensor information collected from two different sensors on the same person but rotated with respect to each other. It is apparent the difference in sensor orientation caused drastically different measurements in the x-, y-, and z-components. FIGS. 3C and 3D illustrate corresponding magnitude time series for FIGS. 3A and 3B, respectively. These magnitude sequences appear to be more consistent than the individual x-, y-, and z-components as sensor orientation changes.

An interesting study was performed comparing the gait ID performances using acceleration magnitudes versus raw acceleration x-, y-, and z-components (see Table 1 below) acquired using mobile phones. It is reported that the magnitude norm feature outperformed features using the x-, y-, z-channel individually or the three channels concatenated when the same classification algorithm was applied. Although it was not explained why the magnitudes appeared more advantageous than the raw acceleration components, it is found that among all the features, only the magnitude feature was robust to variations in sensor orientation, outperforming the others.

TABLE 1

Preliminary accuracy on gait recognition using Gait Dynamics Images.

| Gait ID Accuracy | Train/test on the same day | Train on one day, test on another day |
| --- | --- | --- |
| Magnitude (baseline) | 67.5% | 32.5% |
| Inner Product GDI | 87.5% | 61.3% |
| Cosine Similarity GDI | 85.0% | 66.3% |

For realistic mobile gait biometrics, the placement of the device 2 should be casual and unconstrained. It is essential to extract features that are robust to the sensor rotation. Although magnitude sequences are robust to sensor rotation variations and have been exploited in existing research, valuable gait details crucial to high discrimination may be lost while computing the magnitude series from the 3d raw time series.

Applicants approached this challenge of variations in sensor placement by exploring gait features that characterize the distinguishing locomotion signature while at the same time stay invariant to sensor placement. Although the individual acceleration data depends on sensor placement, it is possible to extract relationships between a pair of the observations from one sensor that does not depend on placement. In certain embodiments of the disclosure, the system subsequently computes features using these pairwise interactions inside each gait cycle to capture the gait dynamics, resulting in invariant signals for gait analysis that aid in discriminating between different individual's gaits.

Orientation invariant gait features: Given two 3d acceleration vectors at times $t_1$ and $t_2$, with measurements $\vec{A(t_1)}=[x(t_1)y(t_1)z(t_1)]^t$ and $\vec{A(t_2)}=[x(t_2)y(t_2)z(t_2)]^t$ by an accelerometer with reference frame OXYZ, assume these forces are also captured by a second accelerometer with a reference frame OX'Y'Z': $\vec{A'(t_1)}=[x'(t_1)y'(t_1)z'(t_1)]^t$ and $\vec{A'(t_2)}=[x'(t_2)y'(t_2)z'(t_2)]^t$. Let the rotation between the two sensors be R. We have $\vec{A'(t_1)}=R\vec{A(t_1)}$ and $\vec{A'(t_2)}=R\vec{A(t_2)}$.

Although the raw acceleration readings depend on the sensor orientation, the Applicants were able to extract orientation invariant features using a pair of motion vectors at times $t_1$ and $t_2$:

$$\langle \vec{A'(t_1)}, \vec{A'(t_2)} \rangle = \langle \vec{RA(t_1)}, \vec{RA(t_2)} \rangle \quad \text{Equation 1}$$
$$= \vec{A(t_2)} TR^T R\vec{A(t_1)}$$
$$= \vec{A(t_2)} T\vec{A(t_1)}$$
$$= \langle \vec{A(t_1)}, \vec{A(t_2)} \rangle$$

Although the accelerometer raw readings depend on the sensor orientation, the inner product between a pair of the 3d measurement vectors do not. The inner product invariant to sensor rotation is defined as:

$$I_{inner}(\vec{A(t_1)}, \vec{A(t_2)}) = \langle \vec{A(t_1)}, \vec{A(t_2)} \rangle \quad \text{Equation 2}$$

This invariant quantity is related to the projection of one acceleration vector on the other, which stays the same regardless of the choice of the reference frame. In the special case when $t_1 = t_2$, $\langle \vec{A(t)}, \vec{A(t)} \rangle = \langle \vec{A'(t)}, \vec{A'(t)} \rangle$ and $\|x(t)^2 + y(t)^2 + z(t)^2\|^{1/2} = \|x'(t)^2 + y'(t)^2 + z'(t)^2\|^{1/2}$. That is, the magnitude of the 3d acceleration vector is invariant to sensor placement. From these invariants, we can also derive additional invariant features with normalizing effects. Among them is the cosine similarity measure:

$$I_{cos}(\vec{A(t_1)}, \vec{A(t_2)}) = \frac{\langle \vec{A(t_1)}, \vec{A(t_2)} \rangle}{\|\vec{A(t_1)}\| \|\vec{A(t_2)}\|} \quad \text{Equation 3}$$

Intuitively, this invariant is the cosine of the angle between two 3D acceleration vectors. It remains the same for all reference frames that are static with respect to each other. Equation 2 and Equation 3 are also invariant to symmetry transforms of the signals.

Gait Dynamics Images: Applicants exploit these invariant motion interactions to extract features that characterize the locomotion dynamics and which are robust to variations in sensor placement. Given a 3d acceleration time series of size n sampled at regular time intervals $\{\vec{A(1)}, \vec{A(2)}, \vec{A(3)}, \ldots, \vec{A(n-1)}, \vec{A(n)}\}$, defining a two dimensional matrix called a Gait Dynamics Image (GDI) to capture invariant motion dynamics over time and interactions within each gait cycle. GDI also extends to all linear transforms of the raw acceleration data, including integration over time for velocity and double integration over time to get displacement. That is, for Equation 2 and Equation 3 (described above), A(t) can be replaced with any linear transform T(A(t)) of A(t). Further, as Equation 2 and Equation 3 are also invariant to symmetry transforms of the signals, this allows GDIs obtained from a phone placed in one side pocket to be matched to GDIs obtained from a phone placed in an opposite pocket.

The invariant feature is then computed using data vectors $\vec{A(t_1)}, \vec{A(t_2)}$ be $I(t_1, t_2)$, using either Equation 2 or Equation 3 (defined above). In certain embodiments, the Gait Dynamics Image (GDI) is defined as follows:

$$GDI(i,j) = I(j, i+j-1), \quad \text{Equation 4}$$

where: $i=1, \ldots, l$ and $j=1, \ldots, n-l+1$ where l is the range of the time delay for concerning pairwise motion interactions. In certain embodiments, context is encoded within a typical gait cycle.

Figure 4:
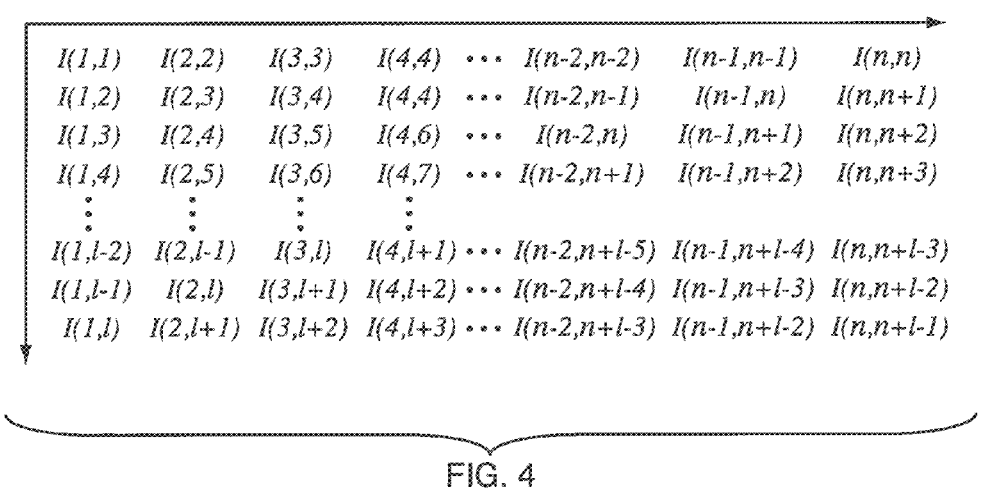
FIG. 4 illustrates a gait dynamics image (GDI) characterizing the flow dynamics over time and interactions within each gait cycle that is independent of the placement of the inertial sensors according to one of the embodiments of the present disclosure.

Gait dynamics images encode rich dynamics and context information characterizing the unique gait of an individual. As shown in the i th row (see FIG. 4) of the GDI contains all pairwise interactions of time delay i−1 over time, while the j th column consists of interactions between the motion at time j and all its successors up to time lag l−1 to capture local context. In particular, the first row of the inner product gait dynamics image, which are the inner products of observation pairs with time lag 0, corresponds to the magnitude sequence that has been shown to be advantageous to the raw component acceleration features in cell phone based gait ID studies, and which has been used in existing research to handle the variations in sensor placement. The remaining rows contain the interactions at varying time lags that contribute to additional discriminating information of the gait dynamics. This makes GDIs extremely powerful representations for gait analysis, such as in gait biometrics on mobile phone and activity tracking on smart watches.

The cosine similarity GDIs can be considered a normalized form of the inner product GDIs by taking out the effects of the magnitudes. These GDIs only depend on the angles between the observation vectors. This normalization may improve the robustness to noisy magnitudes in the data. In summary, the GDI, although built on the sensor rotation dependent raw acceleration measurements, achieves a view invariant representation of the governing dynamics in the original multivariate time series for robust gait analysis. Furthermore, it preserves the local interactions and contextual information within each gait cycle essential for discriminative motion analysis to enable highly accurate gait biometrics.

FIG. 5 illustrates the gait dynamics images for the acceleration sequences in FIG. 3A-D. The GDIs exhibit much better consistencies between the two collections than the raw time series of FIG. 3A-B. GDIs encode both dynamics for the time series and the local interactions. With the irregularly periodic input locomotion time series, gait dynamics images also display quasi-periodicity in both the time and time lag domains with the period approximating the length of a gait cycle.

As shown in the gait dynamic images of FIG. 5, when the time lag coincides with the length of the local gait cycle, the inner product (Equation 2) or normalized correlation (Equation 3) are high as the signals repeat themselves. This is reflected by horizontal lines of high similarity measurements in both GDIs, starting with the first row, repeating at the length of a gait cycle. A bright value at a pixel indicates a high degree of similarity in terms of inner product for the inner product GDIs and normalized correlation for cosine similarity GDIs. Gait cycles can be estimated by fitting smooth horizontal curves across the image which maximizes the overall intensities. Due to the quasi-periodic nature of gait and the repetitive pattern in GDIs, we set l to be a little more than the length of average gait cycles (for example, equal to about 2.5) to preserve all contexts within a gait cycle when computing GDIs.

Gait Identification Using GDIs: One of the method Applicants used is a local patch correlation based similarity measure to match two GDIs. One of the GDIs is divided into adjacent but non-overlapping windows of about two gait cycles (2.4 sec). Each of the windows is correlated with the second gait dynamics image. In the correlation coefficient array, the dominant peak in every window of size of a gait cycle (1.2 sec) is extracted. These coefficients are then sorted and the pth percentile point of the coefficient is used as the score between the window from the first GDI and the second GDI. A score is computed for every window in the first GDI. The qth percentile point of these scores is used as the similarity measure between the two GDIs.

A nearest neighbor classifier is then used to assign the label or identification of the nearest training GDI to the test GDI. The choice of order statistics for similarity measurement helps against the noise in data.

The Applicants conducted some initial performance analysis on gait analysis using the GDIs. The goal was to investigate the effectiveness of GDIs for robust gait biometrics. A large real-world dataset for gait recognition from McGill University was used due to its analogy to realistic gait biometrics using mobile devices. HTC Nexus One phones were used to collect triple axis acceleration data from 20 individuals, each performing two separate 15 minute walks on two different days at an average frame rate of 28 Hz. There was little constraint on the placement of the phone except that it was put in a pocket on the same side for a subject during the two collections. The user could place the phone in any arbitrary orientation facing either inwards or outwards. The subjects were allowed to change clothes and shoes. When a subject changed from a dress to pants, or jeans to baggy shorts, the position and the degree of freedom for the phone to move changed as well, affecting the motion characteristics. The subjects chose whether or not to carry backpacks for each data collection. For these reasons, it is the most realistic and challenging dataset publicly available for practical gait recognition using mobile devices.

GDIs were extracted corresponding to 50 seconds of raw signals with a time lapse of up to 1.2 seconds. A simple correlation based classification method was used to assess the effectiveness of the GDI representations. The similarity between a pair of GDIs was computed by aggregating peak correlation coefficients between sub-GDIs that correspond to a window of two gait cycles (2.4 sec). A testing GDI is then assigned the label of the nearest training GDI. The recognition accuracy using the GDIs was compared to a baseline which used the same classifier, but only on the magnitude series (which is the first row of the inner product GDI). This baseline feature was used because it has been used in existing studies and shown to perform better than others. Two scenarios were examined, the first set of evaluations used data from the same day for both training and testing, with no overlap; the second set of tests used training data from one day and test data from the other day. The second scenario was more challenging as the attires, carried loads, shoes, and most importantly the phone placements were all subjected to change in addition to the variations in the same-day scenario.

Table 1 shows the accuracies for the gait recognition algorithms according to one embodiment of the present disclosure. Although both the magnitude series and GDIs are robust to orientation variations, GDIs contain much more information on context and interactions in gait cycles to offer powerful discrimination and perform significantly better than magnitude features. This advantage is even more drastic for the challenging two day scenario with more variations, where an accuracy of 66.3% was obtained, more than doubling the accuracy using magnitude features. Though all methods performed worse for the two day scenario, the methods using GDIs degraded much more gracefully thanks to their rich discriminating gait dynamics.

For comparison, the Applicants found a published work using this dataset at J. Frank, S. Mannor, J. Pineau, and D. Precup, Time Series Analysis Using Geometric Template Matching, IEEE Trans. *Pattern Analysis and Machine Intelligence,* 35(3): 740-750, March 2013, the contents of which are incorporated herein by reference, where a 49% accuracy was reported on classification of two sec windows for the between day scenario and 62% accuracy on windows with a full span of activities (no pause within). Advanced boosting and bagging techniques were applied on magnitude series in these studies. The Applicants' study indicates that GDIs offer powerful representation encoding gait dynamics and interactions that are robust to sensor placement variations. In certain embodiments, GDI can be combined with advanced machine learning methods such as random forest and boosting to further improve the performance.

Certain embodiments represent invariant gait representation called gait dynamics images (GDIs) that are robust to variations in sensor orientation, and capture the complex dynamics and context within each gait cycle. These relaxed requirements in sensor placement and the high discriminating power combine to enable a robust and accurate computational gait biometrics for casual mobile device users in their day-to-day lives. In addition, gait dynamics images embrace the popular rotation invariant magnitude feature as a subset, and further encode fine scale intrinsic interactions and context within gait cycles to be informative and discriminative. As a result, it is capable of handling a large user population.

Applicants also conducted a gait identification performance study using GDIs on a realistic data set. A correlation based approach was used to match two GDIs. GDIs have shown dominant superiority over magnitude features which have been exploited in state-of-the-art for robust gait analysis. Additionally, those of ordinary skill in the art will appreciate that the present disclosure is also applicable to motion analysis for activity recognition and analysis which would indicate the type of activity in which a person is participating by analyzing collected motion data. Such motion analysis would be useful for health monitoring, disease diagnosis, and the like.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
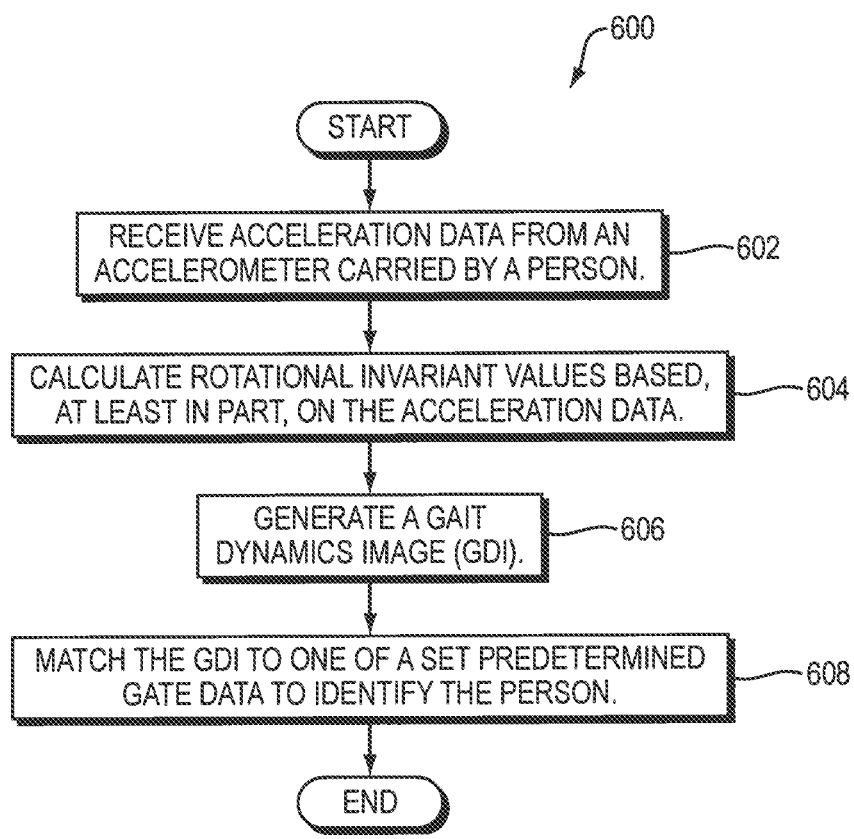
FIG. 6 illustrates an embodiment of a method for identifying an individual based, at least in part, on their gait.

FIG. 6 illustrates a method 600 of identifying an individual based on their gait. Acceleration data is received, at 602, from an accelerometer carried by the person. The acceleration data corresponds to a gait of the person. Rotational invariant values are calculated based, at least in part, on the acceleration data, at 604. The rotational invariant values are independent of a rotational position of the accelerometer on the person and may be calculated as discussed above. A GDI is calculated based, at least in part, on the rotational invariant values. The GDI may be calculated as discussed above. This GDI is matched, at 608, to one of a set of predetermined GDIs to identify the person. For example, this matching can be performed using correlation methods as discussed above.

In the foregoing description, certain terms have been used for brevity, clarity, and understanding. No unnecessary limitations are to be implied therefrom beyond the requirement of the prior art because such terms are used for descriptive purposes and are intended to be broadly construed. Therefore, the disclosure is not limited to the specific details, the representative embodiments, and illustrative examples shown and described. Thus, this application is intended to embrace alterations, modifications, and variations that fall within the scope of the appended claims.

In certain embodiments, the gait representation is invariant to both walking speed and sensor orientation and the remaining noise in the data is mitigated using advanced machine learning methods. In particular, an i-vector approach can be used. This approach is built on factor analysis in order to be robust to variations in data, for accurate gait characterization. Applicants have collected a realistic mobile gait dataset using casually carried mobile phones to collect accelerometer data for 51 subjects at varying walking speeds. Performance evaluation and comparison to state-of-the-art algorithms have demonstrated the superiority of the proposed algorithm in the presence of realistic variations.

Gait dynamics images (GDIs) are a 2d array where the horizontal axis is for time t and the vertical axis is for time lag l. Each entry encodes the interaction in terms of time lagged self-similarity of the 3d acceleration vectors. Specifically, entry (l,t) in the 2d array is defined as either the inner product or the cosine similarity of the motion measurement at time t with the time lagged signal of lag l, ie., the measurement at time t+l. As a result, GDIs are independent of the sensor orientation. Furthermore, as these interactions in GDIs encode both temporal dynamics and the context of gait signals, GDIs are highly discriminative for gait analysis.

Instantaneous gait cycle estimation using GDIs. Human locomotion for gait is quasi-periodic by nature. This characteristic is readily indicated in the patterns in GDIs. As the motion measurements approximately repeat themselves due to the quasi-periodic nature of human gait, the time lagged self-similarity responses encoded in a GDI peak when the time lag l reaches a gait cycle. This results in a continuous horizontal path of high intensity across the gait dynamics image where the row index of an entry on the path approximates the length of the local gait cycle.

In certain embodiments, this property of gait dynamics images is used to estimate gait cycles by computing the horizontal path across the gait dynamics image with the maximum sum of responses on the path. Local gait cycle lengths are then extracted from the path and used to normalize the gait dynamics image to a previously specified gait length for pace independent gait matching.

In certain embodiments, an energy function is used. The function comprises three terms: 1) a prior term encoding the expected or average length of a typical gait cycle; 2) a regularization term enforcing smoothness as gait cycles fluctuate in time, and 3) a likelihood term drawing the path to the maximum response in the GDI image. Given a GDI image I(l,t), l=0, ..., L−1, t=0, ..., T−1, where l is lag and t is time, we denote a path of length T across from the first column to the last column of the GDI as p(t), t=0, ..., T−1 which stores the lag index of the path at time t. Assuming the expected length of a gait cycle to be $T_{cycle}$, we use the following prior term to penalize gait cycles that deviated from the expected cycle length. It is minimized when the estimates equal the expected cycle length:

$$E^p(p(t)) = \Sigma_{t=0}^{T-1}(p(t) - T_{cycle})^2 \quad \text{Equation 5}$$

The second regularization term penalizes changes in the gait cycle to ensure its smoothness, which is minimized for constant gait cycles:

$$E^\gamma(p(t)) = \Sigma_{t=0}^{T-2}(p(t) - p(t+1))^2 \quad \text{Equation 6}$$

The likelihood term locks the path to points of high responses in the GDI:

$$E^l(p(t)) = -\Sigma_{t=0}^{T-1} I(p(t), t) \quad \text{Equation 7}$$

We estimate the cycles by the minimizing the following energy function:

$$\arg\min_{p(t)} \alpha E^p(p(t)) + \beta E^\gamma(p(t)) + E^l(p(t)) \quad \text{Equation 8}$$

where $\alpha$ and $\beta$ are parameters reflecting the importance of the prior and regularization terms.

The optimal path $\widehat{p(t)}$ which minimizes Equation 8 can be efficiently computed using dynamic programming by scanning the GDI image once, left to right and top to bottom. As it scans each node, it computes and stores the score of the optimal path that reaches it starting from the leftmost column, by examining the scores of nodes to its left that connect to it. The proceeding node on this path is recorded as well. Once the scan is completed, the node with the best score is found on the rightmost column, and backtracked to recover the optimal path across the GDI.

Once the optimum path $\widehat{p(t)}$ across the gait dynamic image has been detected, which corresponds to instantaneous gait cycle estimates; the GDI image is unwarped and rectified such that the resultant GDI image is pace independent. This is achieved by first rectifying the original time axis $\vec{t}$ into a standardized time axis $\vec{\tilde{t}}$ such that with the compensated time axis $\vec{\tilde{t}}$ gait cycles are equal to a previously specified constant value $C_s$. The time axis is rectified as follows:

$$\tilde{t}_{l+1} - \tilde{t}_l = (t_{l+1} - t_l) * C_s / \hat{p}(l) \quad \text{Equation 9}$$

$$\tilde{t}_l = t_0 + \Sigma_{j=0}^{l-1} d\tilde{t}_{j,j+1}. \quad \text{Equation 10}$$

Next, once the input time has been mapped to a new time dimension where the gait cycles are constant, a uniform sampling of the new time and time lag dimensions can be completed and the GDI responses can be computed using bi-linear interpolation of the original GDI. This allows computation of pace compensated GDIs. For the rectified GDI, the length of one gait cycle is used as the maximum lag. Note that this rectification is performed in both the time dimension and the lag dimension of GDIs by rectifying the shared time axis. Gait data from different walking speeds can then be compared using their pace-rectified GDIs.

In certain embodiments, the i-vector model that is commonly used for speaker verification is used to extract a single identity vector for a gait sequence of arbitrary length. The identity vector (i-vector) extraction method using total variability factor analysis provides an appealing solution to gait identity extraction using GDIs. In certain embodiments, the i-vector modeling for user authentication consists of three major steps:

1. Building a universal background model (UBM) using a Gaussian mixture model (GMM) by pooling all or a subset of the feature vectors from the training data set. In certain embodiments, the raw GDI features are enhanced with additional delta GDI features, just like delta speech features are used in speaker recognition.

2. Given the trained UBM ($\Omega$), a supervector is computed for each enrollment or authentication gait GDI feature sequence of L frames $\{y_1, y_2, \ldots, y_L\}$, where each frame is a feature vector of dimension F:
   a. the posterior probability ($N_c$) and Baum-Welch statistics ($F_c$) for each Gaussian component are C•F computed as:

$$N_c = \Sigma_{t=1}^L P(c|y_t \cdot \Omega), \text{ and } F_c = \Sigma_{t=1}^L P(c|y_t \cdot \Omega)(y_t - m_c),$$

where $m_c$ is the mean vector for Gaussian component c.
   b. The supervector M is obtained by concatenating $F_c$ for all Gaussian components to form a vector of fixed dimension C∩F for an input sequence of arbitrary length L.
3. Conduct factor analysis in the supervector space using a simplified linear model:

$$M = m + Tw$$

where m is a subject independent component, T is a low rank rectangular matrix, and w is the i-vector. The training process learns the total variability matrix T and a residue variability covariance matrix $\Sigma$. The i-vector is then computed as:

$$w = (I + T^t \Sigma^{-1} NT)^{-1} T^t \Sigma^{-1} M,$$

where N is a diagonal matrix consisting of diagonal blocks of $N_c I$. The UBM and the factor analysis matrixes thus specify an i-vector extractor, which can be trained using data independent of the actual enrollment and authentication data.

Once an i-vector is extracted for each gait sequence, the similarity between two gait sequences is then computed as the cosine distance between their corresponding i-vectors:

$$d(w_1, w_2) = \frac{\langle w_1, w_2 \rangle}{\|w_1\| \|w_2\|}$$

In certain embodiments, the performance of the proposed methodology was tested with normal walking speed, and with multiple speeds. Applicant's used cosine similarity GDIs as they performed better in the performance study. Applicant's collected data from a total of 51 subjects of both genders, with ages ranging from 21-67, height ranging from 60 in to 76 in and weight ranging from 105-260 lbs. Each subject was outfitted with six Google Nexus 5 phones. Two phones were placed in each of the front pants' pockets, two were placed in each of the rear pants' pockets, one was placed in a backpack, and one was held in the subject's hand. The subjects were instructed to walk in a prescribed loop path for four loops. The subjects were instructed to pause between the loops, walking normally in the first two loops, slowly in the third loop, and fast in the fourth loop. The sensor data was collected at 100 Hz. The accelerometer signals were collected using a custom Android app developed by Applicants. For the purposes of the following analysis, only data from the phone placed in the front right pocket was used.

Using the collected data, Applicant extracted a subset of data roughly from the second half of each session. This subset was used as the data for testing conditions under varying walking speeds. Applicant extracted another normal walking speed subset of data from the first half of each data session. This normal walking speed subset was further randomly divided into an enrollment set and a testing set. On average, each subject had 70 seconds of normal speed data for enrollment, 43 seconds of normal walking speed data for testing, and 105 seconds of varying walking speed data for testing.

Next, the regular GDIs were computed and pace normalized GDIs for all data sequences in the enrollment and test sets were also computed. Each subject's GDIs were then divided into non-overlapping 5-second segments for both the enrollment and the testing sets and an i-vector was computed for each segment. In other words, multiple i-vector templates were computed for each subject based on every 5-second data. The gait authentication decisions were based on the 5-second gait datasets.

In certain embodiments, to extract the i-vector from GDI gait representations, a correlation of the current sample frame to every 8th frame until the 60th frame was used, i.e. the extraction GDI feature dimension is 8 at each time step. Similar to speech feature extraction methods used in speech and speaker recognition, delta and delta-delta features were applied to the GDIs to capture feature dynamics based on a frame window size of 2. The final input to the i-vector GMM is thus a 24 dimension feature vector.

In certain embodiments, for i-vector modeling, a UBM consisting of 400 GMMs was used. This resulted in a supervector of 24*400=9600 dimensions for each 5 seconds of gait data. Factor analysis was then performed to extract an identity vector of 100 dimensions for every 5-second segment of gait data. During testing, each testing i-vector was evaluated against all i-vectors of a hypothesis model. Nearest Neighbor classifiers using cosine distance were used to classify each 5-second test segment based on its i-vector. The evaluation was exhaustive, i.e., all testing segments were evaluated against all subject models. The test on the normal speed case had a total of 24,888 comparisons and the test on the varying speed case had a total of 59,313 comparisons.

Figure 8A:
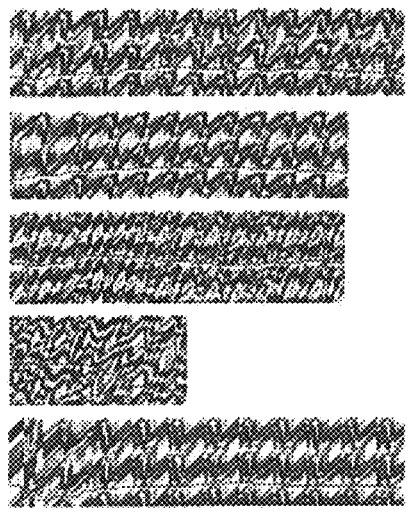
FIG. 8A shows GDIs for five 3D acceleration sequences, with gait cycles detected and marked with solid line.
Figure 8B:
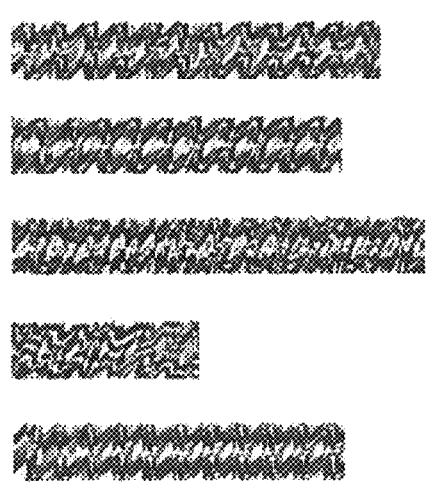
FIG. 8B shows pace normalized GDIs corresponding to the GDI's in FIG. 8(a) where in one embodiment of the present disclosure, the normalization reduces cadence variation within gait sequences while maintaining uniqueness of each gait sequence according to the principles of the present disclosure.

FIG. 7 shows pseudo code for cycle estimation using dynamic programming for one embodiment of the present disclosure. FIG. 8A shows GDIs for five 3d acceleration sequences, with gait cycles detected and marked with solid line. FIG. 8B shows pace normalized GDIs corresponding to the GDI's in FIG. 8A where in one embodiment of the present disclosure, the normalization reduces cadence variation within gait sequences while maintaining uniqueness of each gait sequence according to the principles of the present disclosure.

Figure 9:
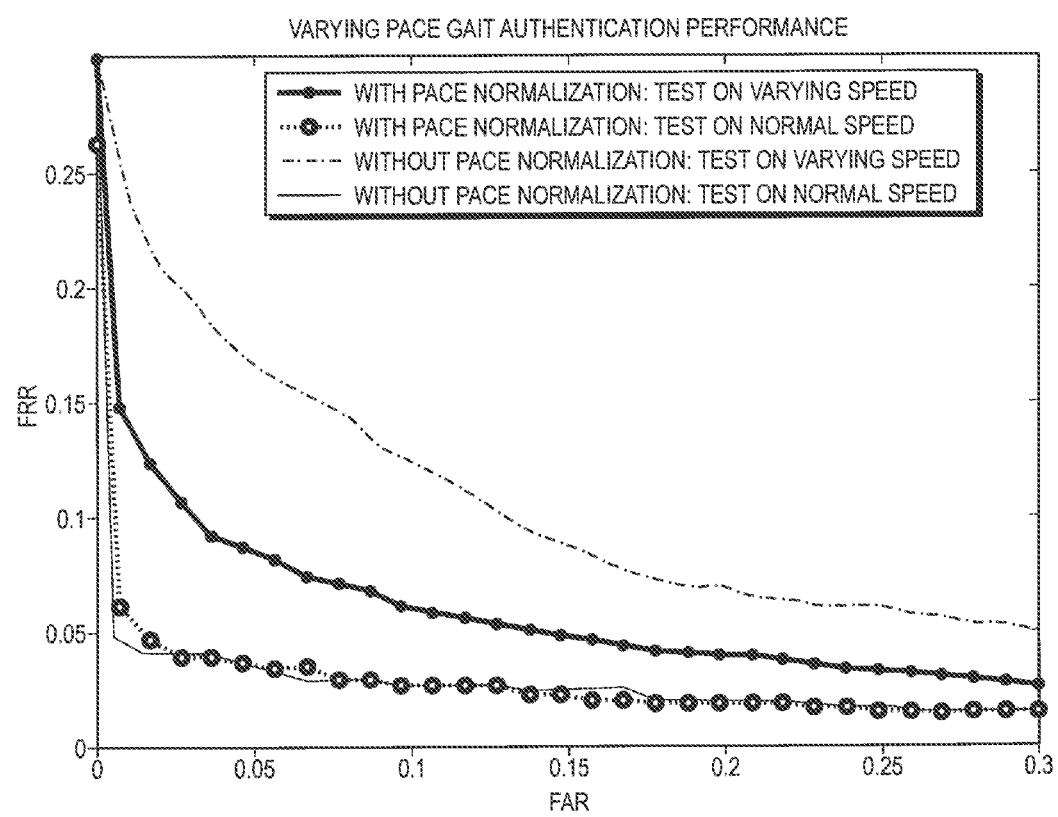
FIG. 9 is a graph showing gait authentication performance, in terms of False Rejection Rate (FRR) and False Acceptance Rate (FAR), based on 5-second gait segments, using regular GDIs and pace normalized GDIs, on testing data with normal walking speeds, and varying walking speeds according to the principles of the present disclosure.

FIG. 9 shows the performance Detection Error Tradeoff (DET) curves for the four tests. In Table 2, the Equal Error Rate (ERR) and its standard deviation for each test is shown. For the less challenging test, with few pace variations, both methodologies worked very well and their performances were statistically equivalent, even though the data was collected with casually placed mobile phones. When gait data with different walking speeds were tested, both approaches degraded. However, the proposed algorithm, i.e., normalization using detected gait cycles, was able to achieve a performance improvement of 37% over the existing GDI approach.

TABLE 2

Gait authentication performance using 5-second gait segments on a 51-subject realistic mobile gait dataset, using regular GDIs and pace normalized GDIs, on testing data with normal walking speeds, and varying walking speeds.

| Accuracy of gait biometrics algorithms EER (of EER) in % | Test scenario | |
|---|---|---|
| | Normal walking speed | Multiple walking speeds |
| GDI approach | 3.88 (0.54) | 11.53 (1.6) |
| Proposed algorithm | 3.89 (0.54) | 7.22 (1.0) |

To work reliably in an unconstrained environment is the common challenge shared by mobile gait biometrics and other biometrics modalities including face recognition, fingerprinting, iris recognition, and voice identification. After years of mobile gait biometrics research under controlled settings there has been a shift toward a more relaxed environment that allows for realistic variations typical in practice. The present disclosure directly addresses two major variations in practical mobile gait biometrics, namely varying walking speed, and sensor rotation, to propose a gait representation that is pace independent and invariant to sensor orientation. The i-vector method is used in certain embodiments as a factor analysis approach to model additional variations in the data and extract subject specific identity signatures for accurate gait biometrics.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of identifying an individual using gait analysis comprising:
receiving, via an invariant processor, acceleration data from an inertial sensor proximate to an individual, wherein the acceleration data corresponds to a gait of the individual;
calculating, via the invariant processor, rotational invariant values based, at least in part, on the acceleration data, wherein the rotational invariant values are independent of a orientation of the inertial sensor proximate to the individual;
calculating, via the invariant processor, inner product values according to:

$$I_{inner}(\overrightarrow{A(t_1)}, \overrightarrow{A(t_2)}) = \langle \overrightarrow{A(t_1)}, \overrightarrow{A(t_2)} \rangle$$

where $\overrightarrow{A(t_1)} = [x(t_1)\ y(t_1)\ z(t_1)]^t$ and $\overrightarrow{A(t_2)} = [x(t_2)\ y(t_2)\ z(t_2)]^t$ are two 3d acceleration vectors at times $t_1$ and $t_2$;
generating, via a gait dynamic image processor, a gait dynamics image (GDI) based, at least in part, on the rotational invariant values;
identifying, via the gait dynamic image processor, a quasi-periodic nature of the gait signals under a general energy minimization paradigm with a Bayesian interpretation;
building, via the gait dynamic image processor, pace independent GDIs to achieve invariance to sensor orientation and gait speed;
matching, via a matching processor, the GDI to one of a set predetermined gait data to identify the individual; and
outputting, via an output line, a result from the matching processor.

2. The method of claim 1, wherein the calculating a rotational invariant value further comprises:
calculating, via the invariant processor, cosine similarity measure values according to:

$$I_{cos}(\overrightarrow{A(t_1)}, \overrightarrow{A(t_2)}) = \frac{\langle \overrightarrow{A(t_1)}, \overrightarrow{A(t_2)} \rangle}{\|\overrightarrow{A(t_1)}\|\ \|\overrightarrow{A(t_2)}\|}$$

where $\overrightarrow{A(t_1)} = [x(t_1)\ y(t_1)\ z(t_1)]^t$ and $\overrightarrow{A(t_2)} = [z(t_2)\ y(t_2)\ z(t_2)]^t$ are two 3d acceleration vectors at times $t_1$ and $t_2$.

3. The method of claim 1, wherein the generating the GDI further comprises generating, via the gait dynamic image processor, the GDI according to:

$$GDI = I_{cos}(j, i+j-1);$$

where: $i=1, \ldots, 1$ and $j \times 1, \ldots, n-l+1$ and where l is the range of the time delay.

4. The method of claim 1, wherein the GDI is a first GDI and further comprises:
calculating, via the gait dynamic image processor, a correlation value associated with a first GDI and a known GDI and wherein the matching the GDIs further comprises matching the first GDI to identify the individual based, at least in part, on the correlation value.

5. The method of claim 1, wherein identifying a quasi-periodic nature of the gait signals comprises,
encoding, via the gait dynamic image processor using a prior term, the expected or average length of a typical gait cycle;
utilizing a regularization term enforcing smoothness; and
utilizing a likelihood term drawing the path to the maximum response in the GDI image.

6. The method of claim 1, wherein building pace independent GDIs comprises:
computing, via the gait dynamic image processor, the horizontal path across the gait dynamics image with the maximum sum of responses on the path;
extracting, via the gait dynamic image processor, local gait cycle lengths from the path; and
normalizing, via the gait dynamic image processor, the gait dynamics image to a previously specified gait length for pace independent gait matching.

7. The method of claim 1, wherein the building pace independent GDIs further comprises: modeling, via the gait dynamic image processor, a gait i-vector.

8. The method of claim 7, wherein the modeling a gait i-vector further comprises: building, via the gait dynamic image processor, a universal background model (UBM) using a Gaussian mixture model (GMM) by pooling a plurality of GDI feature vectors from a training set.

9. The method of claim 7, wherein the modeling a gait i-vector further comprises:
computing, via the gait dynamic image processor, a supervector for each GDI feature sequence of L frames $\{y_1, y_2, \ldots, y_2\}$, where each frame is a feature vector of dimension F according to:

the posterior probability ($N_c$) and Baum-Welch statistics ($F_c$) for each Gaussian component are computed as:

$$N_c=\Sigma_{t=1}^{L}P(c|y_t,\Omega), \text{ and } F_c=\Sigma_{t=1}^{L}P(c|y_t,\Omega)(y_t-m_c),$$

where $m_c$ is the mean vector for Gaussian component c; and obtaining, via the gait dynamic image processor, a supervector M by concatenating $F_c$ for all Gaussian components to form a vector of fixed dimension C·F for an input gait sequence of arbitrary length L.

10. The method of claim 7, wherein the modeling a gait i-vector further comprises:

conducting, via the gait dynamic image processor, factor analysis using a simplified linear model according to:

$$M=m+Tw$$

where m is a subject independent component, T is a low rank rectangular matrix, and w is the i-vector.

11. The method of claim 7, wherein the modeling a gait i-vector further comprises:

computing, via the gait dynamic image processor, the gait i-vector according to:

$$w=(I+T'\Sigma^{-1}NT)^{-1}T'\Sigma^{-1}M,$$

where N is a diagonal matrix consisting of diagonal blocks of $N_cI$, the total variability matrix is T, and a residue variability covariance matrix $\Sigma$.

* * * * *